United States Patent

Risser et al.

(10) Patent No.: US 6,790,301 B2
(45) Date of Patent: Sep. 14, 2004

(54) METHOD AND APPARATUS FOR MAKING A TREAD-BELT ASSEMBLY

(75) Inventors: Philippe Risser, Clouange (FR); Francesco Sorce, Oberpallen (LU); John Kolbjoern Roedseth, Bissen (LU)

(73) Assignee: The Goodyear Tire and Rubber Company, Akron, OH (US)

( * ) Notice: Subject to any disclaimer, the term of this patent is extended or adjusted under 35 U.S.C. 154(b) by 264 days.

(21) Appl. No.: 09/957,732

(22) Filed: Oct. 15, 2001

(65) Prior Publication Data

US 2003/0070742 A1 Apr. 17, 2003

(51) Int. Cl.⁷ .......................... B29D 30/30; B29D 30/58
(52) U.S. Cl. ...................... 156/73.3; 156/123; 156/130; 156/406.4
(58) Field of Search ................................ 156/130, 123, 156/405.1, 406.4, 406.6, 73.3, 133, 134, 128.1; 83/951, 956

(56) References Cited

U.S. PATENT DOCUMENTS

| | | | |
|---|---|---|---|
| 1,423,798 A | | 7/1922 | Hennessy |
| 3,904,471 A | * | 9/1975 | Kubinski ..................... 156/123 |
| 4,470,866 A | * | 9/1984 | Satoh et al. .............. 156/406.6 |
| 4,567,797 A | | 2/1986 | Folk |
| 4,844,768 A | | 7/1989 | Kimura |
| 4,867,434 A | | 9/1989 | Okuyama et al. |
| 4,874,443 A | | 10/1989 | Kipling |
| 4,922,774 A | * | 5/1990 | Oldeman ..................... 83/175 |
| 5,141,587 A | | 8/1992 | Sumiuchi et al. |
| 5,354,404 A | | 10/1994 | Benjamin |
| 5,554,242 A | | 9/1996 | Brown et al. |
| 5,635,015 A | | 6/1997 | Longo et al. |
| 5,882,457 A | | 3/1999 | Currie et al. |
| 5,935,377 A | | 8/1999 | Sergel et al. |
| 6,139,668 A | | 10/2000 | Stokes et al. |

FOREIGN PATENT DOCUMENTS

| | | | |
|---|---|---|---|
| DE | 1904481 A | * | 8/1970 |
| DE | 198 56 720 | | 6/2000 |
| EP | 0387455 | | 9/1990 |
| EP | 0483973 | | 5/1992 |
| EP | 0561609 | | 9/1993 |
| JP | 10-217193 A | * | 8/1998 |

OTHER PUBLICATIONS

U.S. patent application Ser. No. 09/957,785, Zeh et al., filed Sep. 21, 2001.

* cited by examiner

*Primary Examiner*—Geoffrey L. Knable
(74) *Attorney, Agent, or Firm*—Howard M. Cohn (57) ABSTRACT

Method and apparatus for making a tread-belt assembly for a pneumatic tire using a supply ramp to supply green rubber tread stock for application on a substantially cylindrical green rubber belt package; advancing the tread stock along the supply ramp toward the belt package; positioning at least a final portion of the supply ramp substantially along a plane tangent to an outer circumference of the belt package; and applying the tread stock to the outer circumference by moving a leading cut end of the tread stock from the supply ramp to the belt package along the plane tangent to the outer circumference. The green rubber tread stock is held from above for moving by inserting a plurality of transfer pins downward into both edges of the green rubber tread stock such that each transfer pin is angled toward a closest laterally outside edge. The green rubber tread stock is secured for cutting; and is cut using an ultrasonically driven cutting blade such that a wedge of space is created between a back side of the cutting blade and the cut surface of an adjacent cut end of the green rubber tread stock, thereby preventing partial curing of the cut surface of green rubber. A cutting edge of the blade is moved along a first plane which coincides with the cut surface, but the back side of the cutting blade is coincident with a second plane which is angled forward from the first plane by an acute angle.

9 Claims, 6 Drawing Sheets

METHOD AND APPARATUS FOR MAKING A TREAD-BELT ASSEMBLY

CROSS-REFERENCE TO RELATED APPLICATIONS

This application relates to U.S. patent application entitled METHOD FOR MANUFACTURING TIRES ON A FLEXIBLE MANUFACTURING SYSTEM, Attorney's Docket No. DN2001166USA, and filed on even date herewith.

TECHNICAL FIELD OF THE INVENTION

The present invention relates to automated pneumatic tire production systems and, more particularly, to methods and apparatus for automated production of tread-belt assemblies.

BACKGROUND OF THE INVENTION

The tread making process for pneumatic tires typically involves separately building a package out of green (uncured) rubber including a belt package of one or more tread belts or "breakers" plus a tread applied over the belts to form a belt-tread package. Because the belts are intended to be essentially inextensible, the belt-tread package is formed separately on a second stage tire building machine, and then applied to a green tire carcass already assembled on a first stage tire building machine. Then the tire carcass is "blown up" into a toroid shape within the belt-tread package and sent to a mold where the entire assembly is cured into the final tire. Examples of this process are disclosed in U.S. Pat. Nos. 5,141,587, 5,3544,404, 5,554,242, and 6,139,668.

When the belt-tread package is built, the tread is supplied as "tread stock" material which is a continuous strip of green rubber. The continuous strip must be cut to the right length, preferably at an angle, for splicing cut end to cut end to form a closed circle covering the belt package. Typically, the belt package is on a cylindrical assembly drum, and a leading end of the tread stock must be moved over to be positioned properly for wrapping around the outer circumference of the belt package on the assembly drum. An example is set forth in EPO 0, 387,455. Difficulties to be overcome in this operation include holding the tread stock which is soft and tacky, and maneuvering the tread stock from a supply reel or conveyor into proper position on the belt package. This maneuvering typically involves lifting the leading end of the tread stock which is time consuming and can deform the tread undesirably.

The tread stock is generally cut to length with a cutting blade of some sort. Modern equipment has improved the cutting process by using ultrasonic vibration of the cutting blade, but this introduces a new problem. The ultrasonic vibration of the blade causes significant heating in any material touching the ultrasonically driven blade. In particular, where the cut surfaces of the tread stock touch the sides of the cutting blade, ultrasonic heating induces partial curing of the green rubber. This is undesirable because the cut surfaces must be spliced together to form a complete, circular tread, and partially cured spliced surfaces of otherwise green rubber may not fuse together properly during a subsequent tire curing process. It is known to partially address this problem by blowing air in between the cutting blade and the adjacent cut surface. For a blade cutting at an angle, this will work on top of the blade by lifting the cut end of tread stock up away from the blade, but under the blade there is no where for the tread stock to go and it cannot be separated from the blade unless it is deformed or compressed.

It is an object of the present invention to improve the tread making process by addressing the above-described problems in the cutting and moving of the tread stock for application to, and splicing together on, the outer circumference of a belt package.

BRIEF SUMMARY OF THE INVENTION

According to the invention, a method for making a tread-belt assembly for a pneumatic tire comprises the steps of: using a supply ramp to supply green rubber tread stock for application on a substantially cylindrical green rubber belt package; advancing the green rubber tread stock along the supply ramp toward the substantially cylindrical green rubber belt package; positioning at least a final portion of the supply ramp substantially along a plane tangent to an outer circumference of the substantially cylindrical green rubber belt package; and applying the green rubber tread stock to the outer circumference of the substantially cylindrical green rubber belt package by moving a leading cut end of the green rubber tread stock from the supply ramp to the substantially cylindrical green rubber belt package along the plane tangent to the outer circumference of the substantially cylindrical green rubber belt package.

According to the invention, the method further comprises the steps of: holding the green rubber tread stock from above for moving the leading cut end of the green rubber tread stock, and inserting a plurality of transfer pins downward into both lateral outer edges of the green rubber tread stock such that each transfer pin is angled toward a closest laterally outside edge of the green rubber tread stock for holding the green rubber tread stock. Each transfer pin is angled at an angle in the range of 20 degrees to 80 degrees, preferably in the range of 40 degrees to 60 degrees, and most preferably at an angle of 45 degrees.

According to the invention, a method for making a tread-belt assembly for a pneumatic tire comprises the steps of: using a supply ramp to supply green rubber tread stock for application on a substantially cylindrical green rubber belt package; advancing the green rubber tread stock along the supply ramp toward the substantially cylindrical green rubber belt package; securing the green rubber tread stock for cutting; and cutting the green rubber tread stock using an ultrasonically driven cutting blade such that a wedge of space is created between a back side of the cutting blade and the cut surface of an adjacent cut end of the green rubber tread stock.

According to the invention, the method further comprises the steps of: creating the wedge of space by moving a cutting edge of the cutting blade along a first plane which coincides with the cut surface of the adjacent cut end of the green rubber tread stock; and orienting the back side of the cutting blade such that the back side coincides with a second plane which is angled forward from the first plane by an acute cutting blade angle α the cutting blade angle α is within the range of 1 degree to 15 degrees, and preferably within the range of 3 degrees to 8 degrees.

According to the invention, the method further comprises the steps of: blowing air to create a wedge of space between a front surface of the cutting blade and the cut surface of an adjacent cut end of the green rubber tread stock; and securing the green rubber tread stock by inserting a plurality of holding pins into the green rubber tread stock. Preferably, the plurality of holding pins is inserted from below the green rubber tread stock; the cutting blade cuts downward from above the green rubber tread stock; and a roller attached to the cutting blade prevents the green rubber tread stock from lifting when the plurality of holding pins is inserted from below. Optionally, the roller is also used to guard the cutting blade.

According to the invention, the method further comprises the steps of: positioning at least a final portion of the supply ramp substantially along a plane tangent to an outer circumference of the substantially cylindrical green rubber belt package; and applying the green rubber tread stock to the outer circumference of the substantially cylindrical green rubber belt package by moving a leading cut end of the green rubber tread stock from the supply ramp to the substantially cylindrical green rubber belt package along the plane tangent to the outer circumference of the substantially cylindrical green rubber belt package.

According to the invention, apparatus for making a tread-belt assembly for a pneumatic tire comprises: a supply ramp means for supplying green rubber tread stock for application on a substantially cylindrical green rubber belt package; means for advancing the green rubber tread stock along the supply ramp means toward the substantially cylindrical green rubber belt package; means for securing the green rubber tread stock for cutting; and an ultrasonically driven cutting blade for cutting the green rubber tread stock such that a wedge of space is created between a back side of the cutting blade and the cut surface of an adjacent cut end of the green rubber tread stock.

According to the invention, the apparatus further comprises means for creating the wedge of space by moving a cutting edge of the cutting blade along a first plane which coincides with the cut surface of the adjacent cut end of the green rubber tread stock; and by orienting the back side of the cutting blade such that the back side coincides with a second plane which is angled forward from the first plane by an acute cutting blade angle α.

According to the invention, the apparatus further comprises: a plurality of holding pins for securing the green rubber tread stock by inserting the plurality of holding pins into the green rubber tread stock. The apparatus further comprises: means for inserting the plurality of holding pins from below the green rubber tread stock; means for moving the cutting blade downward from above to cut the green rubber tread stock; and means attached to the cutting blade which guard the cutting edge, and which also prevent the green rubber tread stock from lifting when the plurality of holding pins is inserted from below.

According to the invention, the apparatus further comprises: means for positioning at least a final portion of the supply ramp means substantially along a plane tangent to an outer circumference of the substantially cylindrical green rubber belt package; and means for applying the green rubber tread stock to the outer circumference of the substantially cylindrical green rubber belt package by moving a leading cut end of the green rubber tread stock from the supply ramp means to the substantially cylindrical green rubber belt package along the plane tangent to the outer circumference of the substantially cylindrical green rubber belt package.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
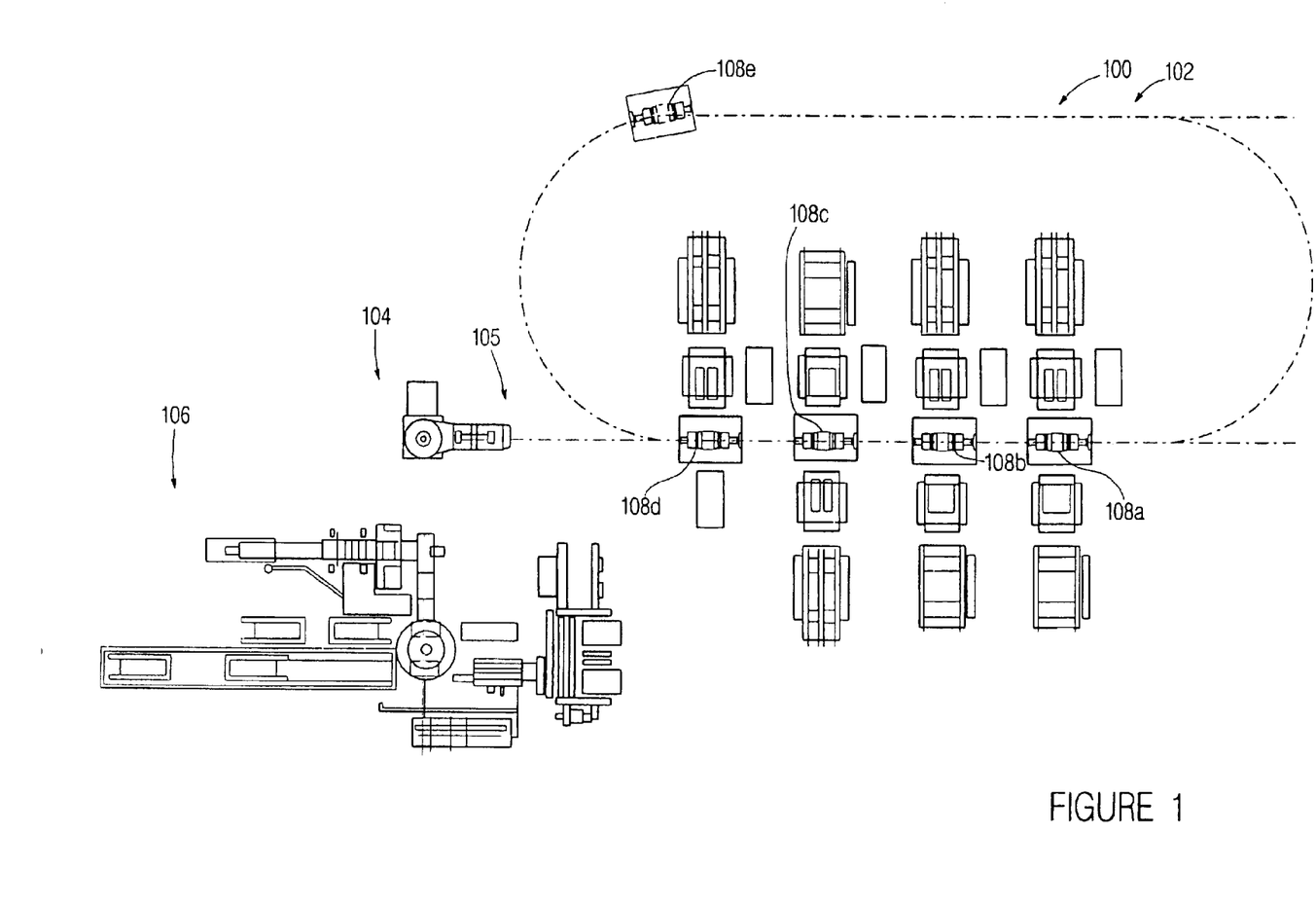
FIG. 1 is a block diagram of an automated tire building system which includes a first and second stage building system for assembling a belt-tread package, according to the invention.
Figure 2:
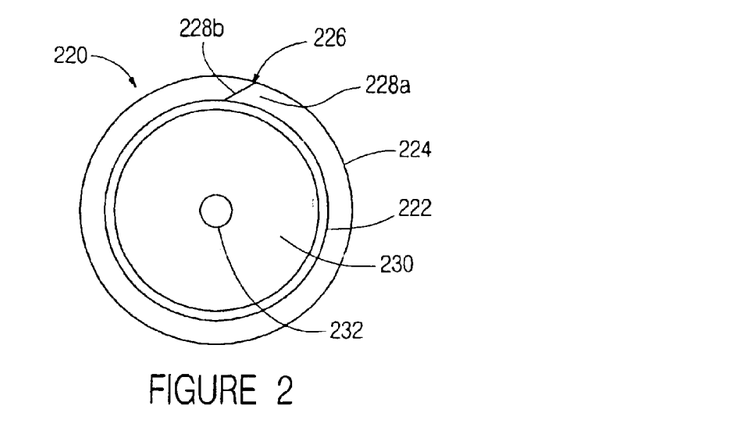
FIG. 2 is a side view of a belt-tread package, according to the invention.

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

Definitions

The following terms may be used throughout the descriptions presented herein and should generally be given the following meaning unless contradicted or elaborated upon by other descriptions set forth herein.

"Axial" and "axially" refers to directions that are on or are parallel to the tire's axis of rotation.

"Axial" refers to a direction parallel to the axis of rotation of the tire.

"Bead" refers to that part of the tire comprising an annular substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Breakers" or "tire breakers" refers to a belt or belt structure or reinforcement belts.

"Carcass" refers to the tire structure apart from the belt structure, tread, undertread over the plies, and the sidewalls; but including the beads, plies, and, in the case of EMT or runflat tires, the wedge inserts sidewall reinforcements.

"Casing" refers to the carcass, belt structure, beads, sidewalls and all other components of the tire excepting the tread and undertread.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Cord" refers to one of the reinforcement strands, including fibers or metal or fabric, with which the plies and belts are reinforced.

"Crown" or "tire crown" refers to the tread, tread shoulders and the immediately adjacent portions of the sidewalls.

"EMT tire" refers to Extended Mobility Technology and EMT tire refers to a tire which is a "runflat", which refers to a tire that is designed provide at least limited operational service under conditions when the tire has little to no inflation pressure.

"Equatorial plane" refers to a the plane perpendicular to the tire's axis of rotation and passing through the center of its tread, or midway between the tire's beads.

"Gauge" refers generally to a measurement, and often to a thickness dimension.

"Inner liner" refers to the layer or layers of elastomer or other material that form the inside surface of a tubeless tire and that contain the inflating gas or fluid within the tire.

"Insert" refers to the crescent-shaped or wedge-shaped reinforcement typically used to reinforce the sidewalls of runflat-type tires; it also refers to the elastomeric non-crescent-shaped insert that underlies the tread; it is also called a "wedge insert."

"Lateral" refers to a direction parallel to the axial direction.

"Meridional profile" refers to a tire profile cut along a plane that includes the tire axis.

"Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Shoulder" refers to the upper portion of sidewall just below the tread edge.

"Sidewall" refers to that portion of a tire between the tread and the bead.

"Tire axis" refers to the tire's axis of rotation when the tire is mounted to a wheel rim and is rotating.

"Tread" and "Tread cap" refer to the tread and the underlying material into which the tread pattern is molded.

"Turn-up end" refers to a portion of a carcass ply that turns upward (i.e., radially outward) from the beads about which the ply is wrapped.

DETAILED DESCRIPTION OF THE INVENTION

As shown in FIG. 1, there is disclosed an automated tire building system 100 that includes a first stage tire building system 102 and a second stage building system 106, as described in detail U.S. patent application entitled METHOD FOR MANUFACTURING TIRES ON A FLEXIBLE MANUFACTURING SYSTEM, Attorney's Docket No. DN2001166USA, which is incorporated herein. A tire carcass is built on each of a plurality of tire building drums 108a, 108b, 108c, 108d, 108e (collectively referred to as "108") as they advance through the first stage tire building system 102. A second stage tire building system 106 includes a shaping turret 104 which after being rotated towards the first stage system 102, receives the tire carcass a carcass transfer device (not shown). Then the shaping turret 104 is moved to a second location, as indicated by arrow 105.

Concurrently with the building of the tire carcass on each tire building drum 108, a belt package covered with a tread (belt-tread package) is built at the second stage building system 106. The second stage building system 106 includes a Breaker-Tread (B&T) turret with two B&T drums. Against one side of one B&T drum are two breaker appliers and a spiral overlay (jointless band) applier. Against the other B&T drum is the tread applier and the breaker tread stitcher. Mounted on a rail base is a B&T transfer ring which transports the completed belt-tread package from the B&T drum to the shaping drum 104. There, the completed belt-tread package is mounted onto the tire carcass already disposed on the shaping turret 104. Next, the green tire carcass is blown up into the belt-tread package to form a green tire. A tire tread stitcher, disposed adjacent the shaping turret 104, operates to consolidate the belt and tread package with the inflated carcass. Once the green tire is completed, it is removed from the shaping turret and into a conveyor to be molded.

The present invention primarily concerns method and apparatus for automated building of the belt-tread package, particularly the portion of the building wherein the tread is applied as a top layer on the outer circumference of the belt-tread package. FIG. 2 illustrates a side view of a typical belt-tread package 220, comprising a tread 224, and a belt package 222 which includes one or more belts or breakers embedded in elastomer and formed into an endless toroid. A spiral overlay (not shown) is optionally included as the top layer of the belt package 222. The tread 224 is generally cut to length from a longer strip of tread stock, with the length calculated to abut cut ends 228a, 228b (collectively referred to as 228) of the tread 224 in a splice 226. The splice 226 is generally angled relative to the radial direction to create a stronger splice. In order to maintain a generally circular shape, the belt-tread package 220 is generally built on a cylindrical assembly drum 230, which, for convenience, generally rotates on an axle 232.

The elastomer used in the belt package 222 and in the tread 224 is uncured and therefore soft and tacky while the belt-tread package 220 is being built, so the belt package 222 and the tread 224 layers stick to each other, and importantly, the cut ends 228 in the splice 226 also stick to each other in a way which allows complete fusion of the cut ends 228 during subsequent curing. An important aspect of the present invention is the apparatus and method for automated tread cutting which does not affect the uncured, tacky nature of the cut ends 228.

In the prior art, a leading cut end 228a of the tread 224 is generally lifted or otherwise maneuvered into position to apply onto the outer circumference of the belt package 222. Another important aspect of the present invention is the apparatus and method for automated tread application which simplifies the tread application in a way which improves the accuracy of tread placement, by moving the leading cut end 228a of the tread 224 from a supply ramp to the outer circumference of the belt package 222 along a tangent to the circumference of the belt package 222.

Figure 3A:
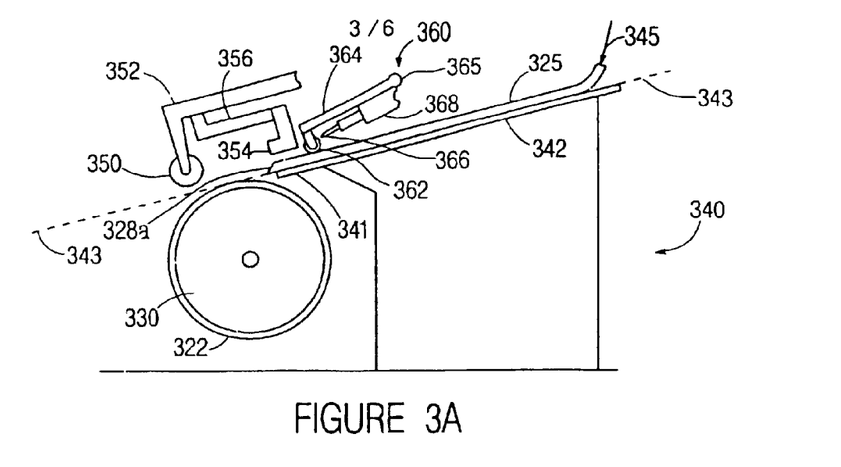
FIGS. 3A, 3B and 3C are side views of a simplified schematic of important parts of a belt-tread package assembly machine, and illustrate a sequence of steps in a belt-tread package assembly method, according to the invention.
Figure 3B:
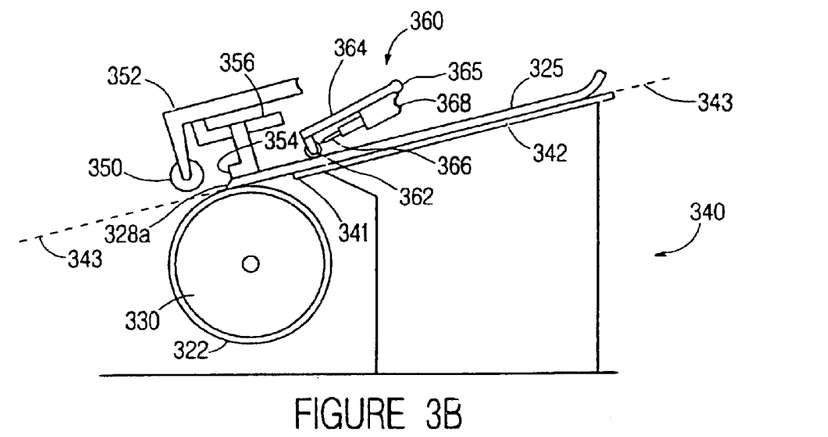
Figure 3C:
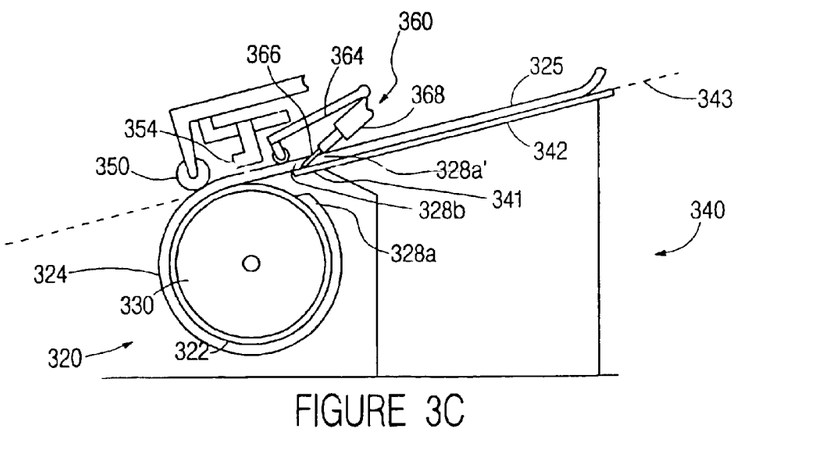

FIGS. 3A, 3B and 3C collectively illustrate a side view of a simplified schematic of important parts of a belt-tread package assembly machine 340 which is a part of the second stage building system 106, according to the invention. Side guards, framing, and miscellaneous mechanisms are not shown, and some elements are only partially shown with cut-off portions indicated by wavy cutoff lines. FIGS. 3A, 3B and 3C also illustrate a sequence of steps in a belt-tread package assembly method according to the invention.

The belt-tread package assembly machine 340 principally comprises a cylindrical assembly drum 330 (compare 230), a supply ramp 342, a transfer head 354, a plunge cutter 360, and a stitching roller 350. A portion of a length of green rubber tread stock 325 is shown being fed onto the supply ramp 342, moving in the general direction indicated by the arrow 345. The tread stock 325 can be supplied, for example, from a supply reel (not shown). The assembly drum 330 is shown with a green rubber belt package 322 (compare 222) positioned around the circumference of the assembly drum 330. The belt package 322 may include an optional spiral overlay as an outer surface. All of the belt-tread package assembly machine 340 components, shown in side view, should be understood to have width dimensions (into the page) suitable for the width of the tread stock 325 and of the belt package 322. In order to accommodate different tread widths, certain components (e.g., the transfer head 354) have width adjustment capability, while other components (e.g., parts of the plunge cutter 360) may be switched with similar components having suitable widths. The assembly drum 330 and the supply ramp 342 are mounted (some framing not shown) in a way which allows adjustment of the relative positioning of the assembly drum 330 and the supply ramp 342 in order to accommodate different diameter belt-tread packages 320. Likewise, the stitching roller 350 is mounted on an arm 352 which enables adjustment for different tread stock 325 thicknesses. The transfer head 354 is mounted on an arm 356 which may be attached to the stitching roller arm 352 so that the transfer head 354 position can be adjusted for different tread stock 325 thicknesses along with the position of the stitching roller 350.

The plunge cutter 360, to be described in more detail hereinbelow, comprises a cutting blade 366 mounted on the end of an ultrasonic converter and booster 368, and a hold-down roller 362 mounted on a pivot arm 364 which is pivotably attached to the ultrasonic converter and booster 368 at a pivot 365 which is spring-loaded (not shown) to force counterclockwise pivoting of the pivot arm 364 about the pivot 365.

The tread making method of the present invention includes the following steps as illustrated in FIGS. 3A, 3B, and 3C.

FIG. 3A shows the tread stock 325 advanced down the supply ramp 342 so that a leading cut end 328a (compare 228a) has advanced to a position at a final portion 341 of the supply ramp 342 close to the assembly drum 330. A belt package 322 is positioned on the assembly drum 330. The transfer head 354 is shown positioned above the leading cut end 328a of the tread stock 325, ready to move down to engage the top of the tread stock 325. The plunge cutter 360 is in a retracted position with the hold-down roller 362 pivoted (under spring force) down in front of the cutting blade 366 to serve as a guard for the cutting blade. The guarding function of the hold-down roller 362 is both a safety feature, for protection of human machine operators/mechanics, and also a protective feature which prevents incidental damage to the cutting blade 366.

FIG. 3B shows the leading cut end 328a of the tread stock 325 after it has been transferred from the final portion 341 of the supply ramp 342 to be stuck to the tacky, substantially cylindrical outer circumferential surface of the belt package 322 on the assembly drum 330. An important aspect of the present invention is that the supply ramp 342, or at least the final portion 341 of it ending close to the assembly drum 330, has a planar surface coinciding with a plane 343 which is tangential to the substantially cylindrical surface of the belt package 322 on the assembly drum 330. This enables the transfer head 354 to move the leading cut end 328a of the tread stock 325 along a straight path coinciding with the plane 343, thereby minimizing and simplifying the maneuvering of the tread stock 325 to allow easy, fast, and accurate positioning of the tread stock 325 on the belt package 322.

FIG. 3C shows the tread stock 325 after it has advanced enough to wrap mostly around the belt package 322, forming most of a tread 324 (compare 224) for a newly-built belt-tread package 320 (compare 220). Known techniques are used to advance and wrap the tread stock 325, e.g., driving the rotation of the assembly drum 330 to pull the tread stock 325 which is stuck on the surface of the belt package 322 due to the tacky nature of the green rubber in both the tread stock 325 and the belt package 322. The stitching roller 350 is rolling on the outer surface of the tread 324 as the tread 324 rotates around underneath the stitching roller. The stitching roller 350 uses known techniques (e.g., spring force) to apply pressure suitable for "stitching" the tread 324 to the belt package 322. The transfer head 354 is not in use at this time, and is parked in a retracted position, above and not in contact with the tread stock 325. The advancing of the tread stock 325 has been temporarily halted at a suitable point to allow cutting the tread stock 325 to a pre-determined length for the tread 324 which will allow a suitable tread splice 226 (see FIG. 2). In a process to be described hereinbelow, the plunge cutter 360 has advanced to cut through the tread stock 325, thereby forming a trailing cut end 328b and a next-piece leading cut end 328a'. Following the step shown in FIG. 3C, the assembly drum 330 can rotate again, thereby advancing the remaining portion of the tread 324 to finish wrapping the tread 324 to where the trailing cut end 328b is laid down on the leading cut end 328a to form a splice 226. The assembly drum 330 can be rotated enough to cause the spliced ends 328a and 328b to pass beneath the stitching roller 350 which will firmly press together the spliced ends 328a and 328b. The assembly drum 330 can continue to rotate the new belt-tread package 320 under the stitching roller 350 until the stitching process is sufficiently completed. Subsequently, the stitching roller 350 is retracted, the belt-tread package 320 is removed and a new belt package 322 is placed on the assembly drum 330. Continuing, the stitching roller 350, the transfer head 354, and the plunge cutter 360 are re-positioned so that the tread stock 325 can begin advancing again, thereby returning to the step illustrated in FIG. 3A. Alternatively, the assembly drum 330 with the completed belt-tread package 320 is moved away from the stitching roller 350, and optionally replaced with another assembly drum 330 having a belt package 322 on it.

The transfer head 354 is an inventive end effecter mounted on a commercially available pick-and-place unit capable of controlled two axis motion: translation along one axis (e.g., arm 356, for transferring the leading cut end 328a of the tread stock 325), and extension/retraction along an orthogonal axis (for engaging/disengaging the transfer head 354 with/from the tread stock 325). Although the pick-and-place unit is commercially available, the placement/mounting of the unit, the orientation of axes, the dimensioning of axis motion ranges, and the control programming of the unit are all within the scope of the present invention, since these are factors enabling the inventive method of transferring the leading cut end 328a of the tread stock 325 from the supply ramp 342 to the assembly drum 330.

Figure 4:
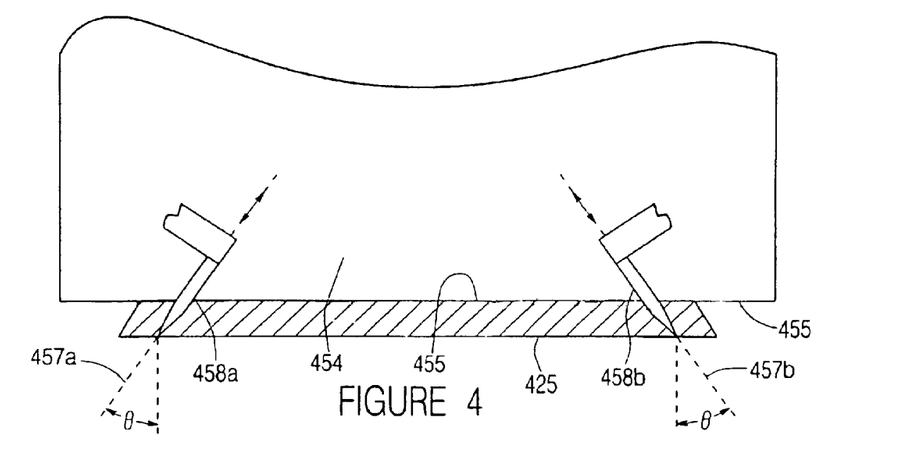
FIG. 4 is an end cross-sectional view of tread stock being held by a transfer head, according to the invention.
Figures 5A, 5D, 5E:
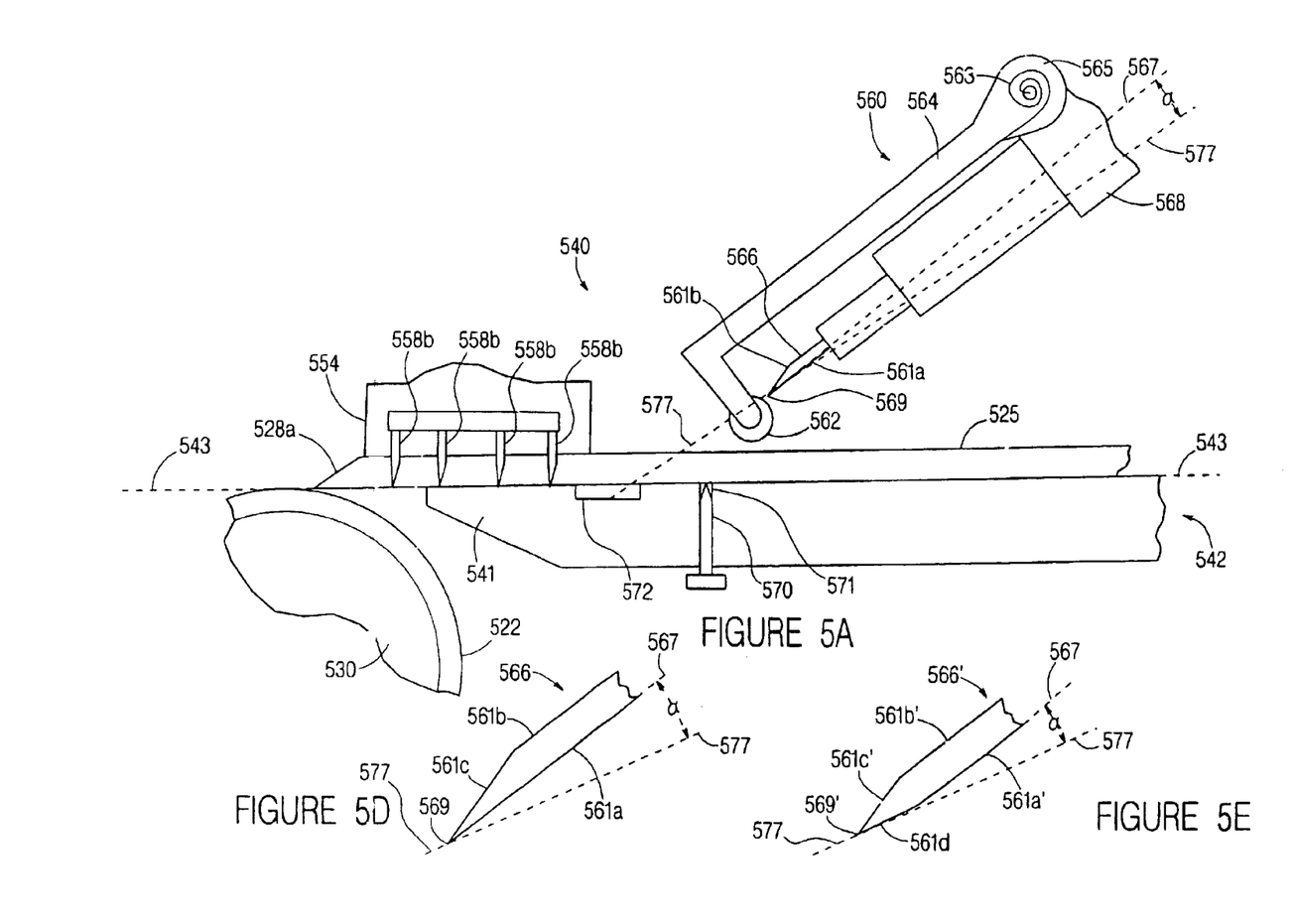
FIGS. 5A, 5B, and 5C are magnified side views of cutaway portions of selected elements of the belt-tread package assembly machine of FIGS. 3A, 3B and 3C with emphasis on the details of a plunge cutter, according to the invention.
FIGS. 5D and 5E are partial side views of two alternative embodiments of cutting blades for the plunge cutter of FIGS. 5A, 5B, and 5C, according to the invention.

FIG. 4 is an end cross-sectional view of tread stock 425 (compare 325) being held by a transfer head 454 (compare 354) which is engaged (in contact) with the tread stock 425. An important feature of the present invention is the way transfer pins 458a and 454b (collectively referred to as 458) are used by the transfer head 454 to hold the tread stock 425. Preferably, there are a plurality of pin pairs 458a/458b, roost preferably four pin pairs 458a/458b, arranged along the length of the transfer head 454, back into the page as viewed in FIG. 4. Four transfer pins 558b (compare 458b) can be seen in the side, partial cross-sectional view of FIG. 5A. The transfer pins 458a and 458b move along respective paths 457a and 457b. The paths 457a and 457b both preferably lie in the same plane which is preferably approximately perpendicular to the plane of the top surface of the tread stock 425. Most importantly, the paths 457a and 457b are angled outward (angled toward the closest laterally outside edge of the tread stock 425) by an amount indicated in FIG. 4 as the angle θ between each path 457a, 457b and a line which is normal to the bottom surface of the tread stock 425. The angle θ is in the range of 20° to 80°, preferably 40° to 60°. and most preferably 45° (degrees). As shown in FIG. 5A, the disclosed angling of the transfer pins 558a (not shown) and 558b, enable the transfer bead 554 to hold the tread stock 525 from above, and to control translational movement of the tread stock 325, 425, 525 from the supply ramp 542 (compare 342.) to the assembly drum 530 (compare 330). In FIGS. 4 and 5, the transfer pins 458a/458b, 558a/558b, respectively, are shown extended along their respectively, paths 457a/457b so that the transfer pins 458a/458b, 558a/558b are inserted into the tread Mock 425,525 for holding the tread stock. When the transfer head 454,554 is not holding the tread stock 425,525, the transfer pins 458a/458b, 558a/558b are retracted along their respective paths 457a457b so that the transfer pins are within the transfer head 454, 554, i.e., not protruding below a bottom surface 455, 555 of the transfer head 454, 554. In order to hold the tread stock 425, the transfer head 454, with retracted transfer pins 458, extends toward the tread stock 425 until the bottom surface 455 engages with the top surface of the tread stock 425. Then the transfer pins 458a/458b are extended along their respective paths 457a/457b so that the transfer pins 458a/458b are inserted into the tread stock 425 for holding the tread stock 425. After transferring the tread stock 425 to the drum 430, the transfer head 454 releases the tread stock 425 by retracting the transfer pins 458a/458b along their respective paths 457a/457b so that the transfer pins are within the transfer bead 454. Then the transfer head 454,554 disengages by moving away from the drum 430,530 thereby separating the transfer head, bottom surface 455,555 from the top surface of the tread stock 425,525.

Figure 5B:
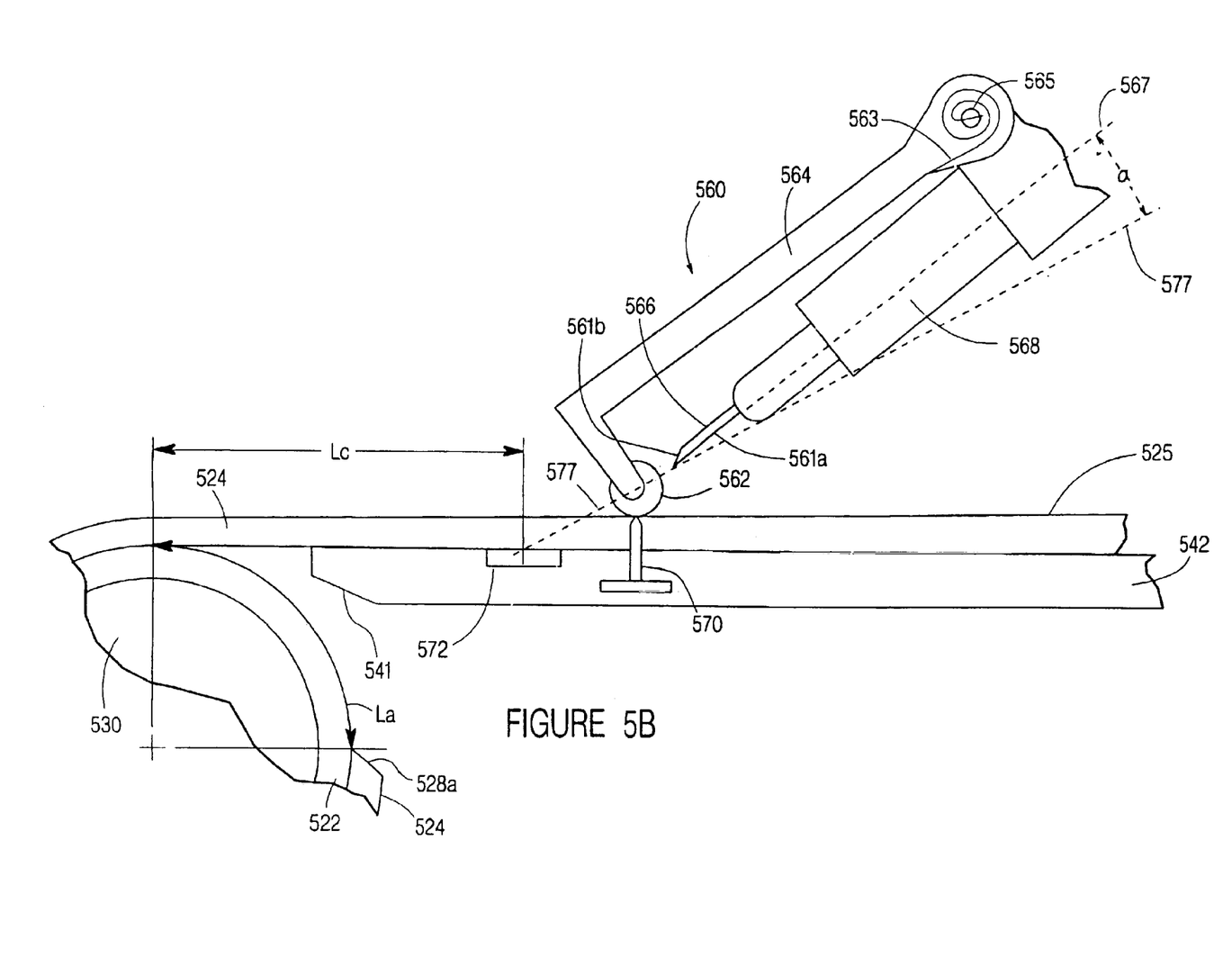
Figure 5C:
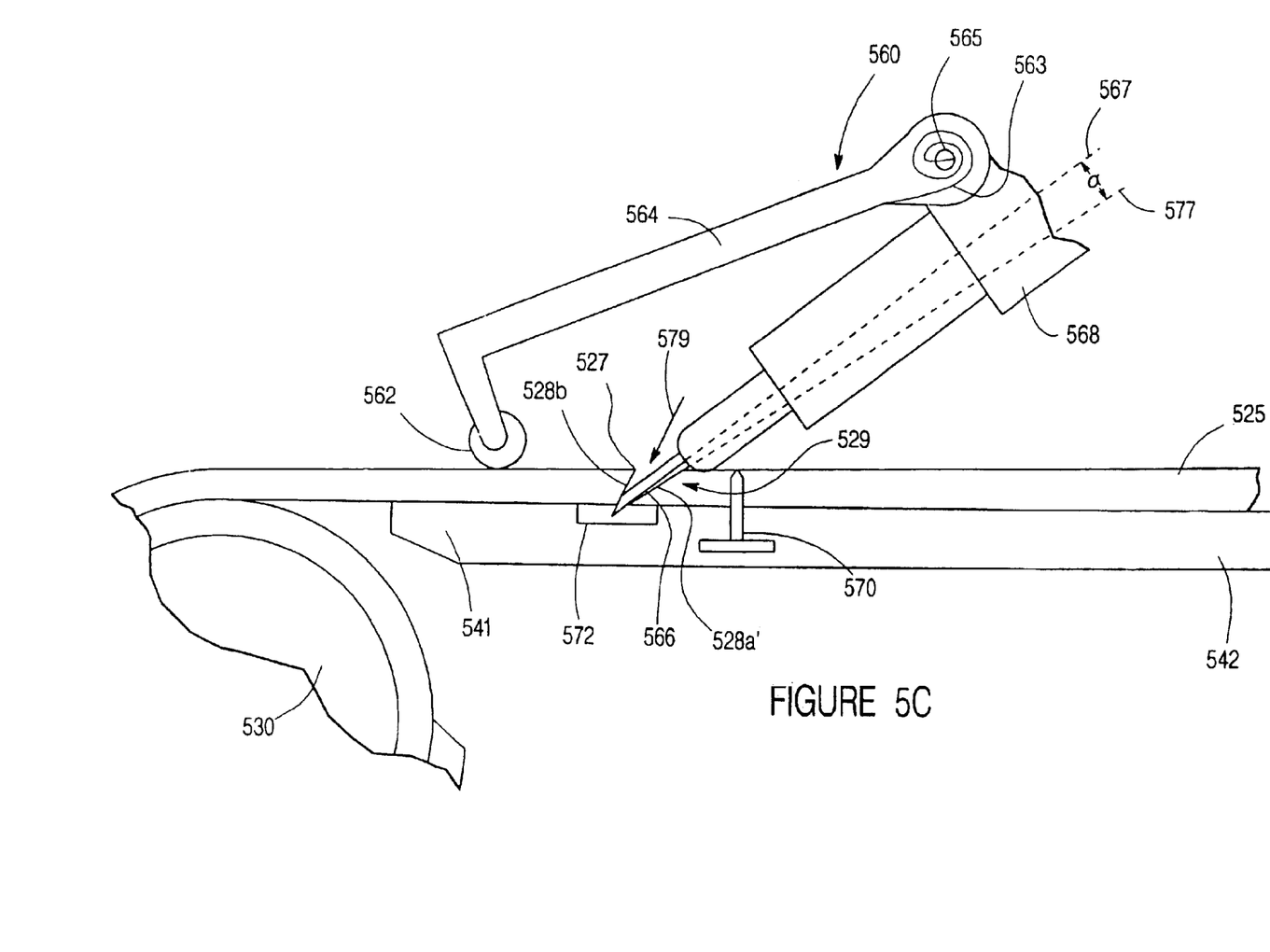

Referring to FIGS. 5A, 5B, and 5C, the inventive apparatus and method for plunge cutting the tread stock 525 will now be described in greater detail. Selected steps in the tread making method of the present invention are illustrated sequentially in FIG. 5A, followed by FIG. 5B, followed by FIG. 5C. The views of FIGS. 5A, 5B, and 5C are magnified side views of cutaway portions of selected elements of a belt-tread package assembly machine 540 (compare 340) with emphasis on the details of a plunge cutter 560 (compare 360). Side guards, framing, and miscellaneous mechanisms are not shown, and some elements are only partially shown with cut-off portions indicated by wavy cutoff lines. Certain elements, as indicated below, are actually internal elements which are shown as a quasi "X-ray" view. The views of FIGS. 5A, 5B, and 5C are oriented relative to a supply ramp 542 (compare 342) which is illustrated in a horizontal position for illustrative convenience. It should be understood that the horizontal position is not limiting, and the scope of the invention includes supply ramps 342, 542 which are at any suitable angle, but preferably downward sloping as illustrated in FIGS. 3A, 3B, and 3C.

FIG. 5A shows a leading cut end 528a (compare 328a) of tread stock 525 (compare 425) being transferred by a transfer head 554 (compare 354) from the final portion 541 (compare 341) of the supply ramp 542 (compare 342) to be stuck to the tacky, substantially cylindrical outer circumferential surface of a belt package 522 (compare 322) on an assembly drum 530 (compare 330). The leading cut end 528a is transferred along a path coinciding with a plane 543 (compare 343) which is tangential to the substantially cylindrical surface of the belt package 522 on the assembly drum 530. The transfer head 554 is engaged with the tread stock 525 and is holding the tread stock 525 by means of transfer pins, of which four transfer pins 558b (compare 458b) along one side of the transfer head 554 are shown in an X-ray view. The plunge cutter 560 comprises a cutting blade 566 (compare 366) mounted on the end of an ultrasonic converter and booster 568 (compare 368), and a hold-down roller 562 (compare 362) mounted on a pivot arm 564 (compare 364) which is pivotably attached to the ultrasonic converter and booster 568 at a pivot 565 (compare 365) which is spring-loaded by a spring 563 to force counterclockwise pivoting of the pivot arm 564 about the pivot 565. The plunge cutter 560 is shown in its retracted position, with the hold-down roller 562 spring-forced down in front of the cutting blade 566 for guarding a cutting edge 569 of the cutting blade 566. Although the hold-down roller 562 is preferably not touching the tread stock 525 until a cutting process begins, it is within the scope of the invention for the hold-down roller 562 to press against the top surface of the tread stock 525 whenever the tread stock is advancing, for helping to control the movement of the tread stock. A cutting recess 572 is shown as a recession in the top surface of the supply ramp 542, extending across the width of the supply ramp 542 for the purpose of allowing the cutting blade 566 to cut entirely through, and slightly beyond, the thickness of the tread stock 525 without the cutting edge 569 hitting the supply ramp 542. One of a plurality (preferably two or more) of holding pins 570 are shown in an X-ray view. The plurality of holding pins 570 are spaced across the width of the supply ramp 542, and are generally connected to each other in a way which enables the holding pins 570 to move up and down through the top surface of the supply ramp 542, e.g., through holes or slot 571. In FIG. 5A, the holding pins 570 are shown in a retracted position, not interfering with the advancing of the tread stock 525 along the supply ramp 542.

The orientation of the plunge cutter 560 is an important feature of the present invention. In particular as shown in FIG. 5D, a back surface 561a of one embodiment of the cutting blade 566 is flat and intersects with a plane 567 indicated by a dashed line 567. When cutting the tread stock 525, the cutting edge 569 moves along a path 577 which is at a cutting blade angle α to dashed line 567. The cutting blade angle α is an acute angle within the range of 1 to 150, and preferably within the range of 3 to 80 (degrees), and importantly, the cutting blade beck surface 561a. is in front of the path 577 of the cutting edge 569, as shown. A front surface 561b of the cutting blade 566 and a beveled or sloped portion 561c for at least a short distance extending from the cutting edge 569 in order to accommodate a normal thickness for the cutting blade 566 and still form a knife edge for the cutting edge 569. Known, conventional designs may be utilized for the front surface 561b of the cutting blade 566 since an aspect of the present invention especially relates to the design of the back surface 561a of the cutting blade 566. It is within the scope of the present invention for the plane 567 of the back surface 561a of the cutting blade 566 to coincide with a flat portion of the bock surface 561a which extends back from a bevel or slope at the cutting edge 569. For example two alternative embodiments of the cutting blade 566 and 566' are illustrated in partial side view in FIGS. 5D and 5E, respectively.

Referring to FIG. 5D, the cutting blade 566 has aback surface 551a which is flat all the way from the cutting edge 569 and coincides with the plane 567 which is in front of the cutting path 577 extends back from a beveled portion 561c which connects the cutting edge 569 to the remainder of the front surface 561b. The front surface 561b can be, but is not necessarily, parallel to the back surface 561a.

Referring to FIG. 5E, an alternative embodiment of the cutting blade 566' has aback surface 561a' which extends back from a beveled portion 561d' which connects the cutting edge 569' to the flat remainder of the back surface 561a'. The flat portion of the back surface 561a' is flat all the way from the beveled portion 561d' and coincides with the plane 567' which is in front of the cutting path 577 and forms the cutting blade angle α with respect to the cutting path 577. The front surface 561b' extends back from a beveled portion 561c' which connects the cutting edge 569' to the remainder of the front surface 561a. The front surface 561b can be, but is not necessarily, parallel to the back surface 561a.

FIG. 5B shows the tread stock 525 being secured as the inventive cutting process begins. The tread stock 525 has advanced enough for a tread 524 (compare 324) to be formed almost completely around the outer circumferential surface of the belt package 522 on the assembly drum 530, and the tread stock 525 is now in a suitable position for being cut to the tread length, i.e., a cut-off length "Lc" of the tread stock 525, measured from the line where the tread stock 525 first touches the belt package 522 to the line 577 of the cutting path, is equal to an arc length "La" of circumference still needing tread stock 525 to complete the tread 524, wherein the arc length La is measured from the leading cut end 528a around the circumference of the belt package 522 to the line where trailing cut end 528b of the tread stock 525 last touches the belt package 522, to form the splice joint with the leading end 528a. When the condition La=Lc is met, the tread stock 525 is halted so that it is not advancing, the assembly drum 530 also ceases rotation, and the holding pins 570 are extended up into the tread stock 525 for securing the tread stock 525 in position for cutting. To prevent lifting of the tread stock 525 by the extending holding pins 570, the hold-down roller 562 is moved to a position directly over the holding pins 570, as shown in FIG. 5B, by advancing the plunge cutter 560 along its cutting path 577. Preferably, machine timing is controlled to extend the holding pins 570 immediately after the tread stock advancement is halted, and further controlled to advance the plunge cutter 560 so that the hold-down roller 562 rolls over the holding pins 570 as they are extending to press the stock down into firm engagement with the supply ramp 542. It can be seen that a hold-down force results from the counter-clockwise spring force of the spring 563. It can also be seen that advancing the plunge cutter 560 along its cutting path 577 causes the pivot arm 564 to rotate clockwise about the pivot 565 as the hold-down roller 562 rolls along the top surface of the tread stock 525, thereby swinging the hold-down roller 562 and pivot arm 564 away from its guarding position in front of the cutting blade 566.

FIG. 5C shows the result of a completed cutting of the tread stock 525 by the inventive plunge cutter 560, thereby creating a trailing cut end 528b suitable for splicing with the leading cut end 528a of the tread 524, and simultaneously creating another leading cut end 528a' which will be the beginning of the next tread on the next belt package (not shown). Subsequent to the securing step shown in FIG. 5B, the plunge cutter 560 has advanced so that the cutting edge 569 has followed the cutting path 577 all the way through the tread stock 525 and stopped as the cutting edge 569 breaks through to protrude slightly into the cutting recess 572. The pivot arm 564 continued to rotate clockwise about the pivot 565 as the hold-down roller 562 rolled along the top surface of the tread stock 525.

A unique feature of the present invention is the wedge of space 529 which is created between the flat back surface 561a, 561a' of tho cutting blade 566, 566', respectively, and an adjacent cut surface of the next loading cut end 528a' of the tread stock 525. The wedge shaped section 529 of space is created because the back surface 561a 561a' is angled away from the cut surface of the next leading cut end 528a' with the cutting blade angle α noting that the cut surface of the next leading cut end 528a is coincident with the path 577 of the cutting edge 569. The wedge shaped section of space 529 is important because it reduces heat build up between the stock material and the cutting blade 566, 566' and thereby prevents partial curing of the cut surface of the next leading cut end 528a'. The partial owing can be caused by the heat generated from the contact of the stock material with a side of the ultrasonically driven cutting blade 566. During the cutting of the tread stock 525, the cutting action of cutting blade 566, 566' creates a flap like, trailing cut end 528b of the tread stock which has a tendency to lift away from the front surface 561b. 561b' of the cutting blade 566, 566 to form a second wedge shaped section of space 527. This flap having a tendency to lift away from the stock material and the cutting blade allows for natural heat dissipation from the surface of the trailing cut end 528b. Where desired, the heat transfer can be increased by utilizing known means, e.g., blowing air in the direction indicated by arrow 579 into the second wedge shaped section of spate 527 between the front surface 561b, 561b' of the cutting blade 566, 566' and the cut surface of the trailing cut end 528b of the tread stock 525. Controlling the temperature of the material around the trailing cut end 528b helps prevent partial curing of the cut surface of the trailing cut end 528b.

Immediately after the completed cutting step shown in FIG. 5C, the assembly drum 530 can be rotated enough to pull the trailing cut end 528b onto the outer circumference belt package 522 and passing under the stitching roller 350 to complete the splice of the trailing cut end 528b with the leading cut end 528a, thereby forming a complete green tread 524 and belt package (compare 220). Simultanously, the plunge cutter 560 and the holding pins 570 can be retracted, after which the tread stock 525 can begin advancing to return to a first step in the process of building a next belt-tread package.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for making a tread-belt assembly for application to a tire carcass, the method comprising the steps of:
    advancing a leading end of a length of tread stock to an outer circumferential surface of a belt package disposed about an assembly drum;
    applying the leading end of the length of tread stock to the outer circumferential of the belt package;
    rotating the assembly drum to apply a section of tread stock to the outer circumference of the belt package;
    cutting the length of tread stock to form a trailing end of the section of tread stock and a leading end of the remaining length of tread stock; and
    applying the trailing end of the section of tread stock to the circumference of the belt package and abutting the trailing end to the leading end of the section of tread stock;
    wherein the step of advancing the leading end of the length of tread stock includes the steps of:
    gripping the leading end of the length of tread stock prior to cutting the length of tread stock; and
    advancing the leading end of the length of tread stock by moving the gripped leading end;
    and wherein the step of gripping includes the step of;
    inserting a plurality of transfer pins downward into both lateral outside edges of the tread stock such that each of the plurality of transfer pins is angled toward a closest, laterally outside edge of the tread stock for securely gripping the tread stock from above.

2. The method of claim 1, wherein the step of advancing the leading end of the length of tread stock includes the steps of;
    gripping the leading end of the length of tread stock prior to cutting the length of tread stock; and
    advancing the leading end of the length of tread stock by moving the gripped leading end.

3. The method of claim 1, including the step of:
    inserting each of the plurality or transfer pins by an angle θ in the range of 20 degrees to 80 degrees into a surface of the tread stock disposed between the lateral outside edges of the tread stock wherein the angle θ is measured from a normal to the bottom of the tread stock laterally outward to an insertion path of the transfer pin.

4. The method of claim 3, including the step of:
    inserting each of the plurality of transfer pins by an angle θ in the range of 40 degrees to 60 degrees.

5. The method of claim 4, including the step of:
    inserting each of the plurality of transfer pins by an angle θ of 45 degrees.

6. A method for making a tread-belt assembly for pneumatic tire, the method comprising the steps of:
    advancing a leading end of a length of tread stock along a supply ramp towards an outer circumferential surface of a belt package disposed about an assembly drum;
    applying the leading end of the length of tread stock to the outer circumference of the belt package;
    rotating the assembly drum to apply a section of tread stock to the outer circumference of the belt package;
    securing the length of tread stock to the supply ramp for cutting wherein the step of securing includes inserting a plurality of holding pins through the supply ramp and into the tread stock;
    cutting the length of tread stock to form a trailing end of the section of tread stock and a leading end of the remaining length of tread stock;
    said step of cutting including the step of cutting the tread stock with an ultrasonic cutting blade disposed such that a rear facing, back side of the cutting blade is disposed at an angle to a surface of the tread stock whereby a wedge shaped space is created between the back side of the cutting blade and the surface of the tread stock; and
    applying the trailing end of the section of tread stock to the circumference of the belt package and abutting the trailing end to the leading end of the section of tread stock;
    wherein the wedge shaped space is created by moving a cutting edge of the cutting blade along a first plane which coincides with the cut surface of the leading end of the tread stock; and
    positioning the back side of the cutting blade to coincides with a second plane which is angled forward from the first plane by a cutting blade angle $\alpha$ that is within the range of above 3 degrees to 15 degrees: and
    further including the steps of:
    inserting the plurality of holding pins from below the tread stock;
    directing the cutting blade downward from above the tread stock; and
    pressing a roller against the tread stock to reduce the lifting of the tread stock caused by the insertion of the plurality of holding pins from below the tread stock;
    wherein the roller is mounted on a spring-loaded pivot arm that is pivotably attached to the cutting blade in a way that guards a cutting edge of the cutting blade except when cutting blade advancement presses the roller against the tread stock which also swings the roller away from its guarding position.

7. Method of claim 6, wherein:
    the cutting blade angle $\alpha$ is within the range of above 3 degrees to 8 degrees.

8. Method of claim 6, further including the step of:
    blowing air to create a wedge of space between a front surface of the cutting blade and the cut surface of the trailing end of the section of tread stock.

9. Method of claim 6, further including the step of blowing air to increase
    heat transfer from the cut surface of the trailing end of the section of tread stock.

* * * * *